Dec. 24, 1968         JINICHI KATO ET AL         3,417,685
      STEREOSCOPIC PHOTOGRAPHING DEVICE AND PHOTOGRAPHING
             DIRECTION INDICATOR FOR SUCH DEVICE
Filed Oct. 20, 1965                              3 Sheets-Sheet 1

INVENTORS
J. KATO, H. HASEGAWA and M. MIYADERA
BY

ATTORNEY

Dec. 24, 1968  JINICHI KATO ET AL  3,417,685
STEREOSCOPIC PHOTOGRAPHING DEVICE AND PHOTOGRAPHING
DIRECTION INDICATOR FOR SUCH DEVICE
Filed Oct. 20, 1965  3 Sheets-Sheet 2

INVENTORS
J. KATO, H. HASEGAWA AND M. MIYADERA
BY
ATTORNEY

Dec. 24, 1968   JINICHI KATO ET AL   3,417,685
STEREOSCOPIC PHOTOGRAPHING DEVICE AND PHOTOGRAPHING
DIRECTION INDICATOR FOR SUCH DEVICE
Filed Oct. 20, 1965                         3 Sheets-Sheet 3
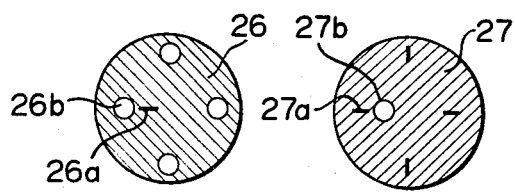
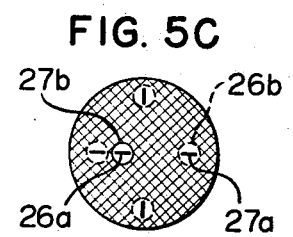
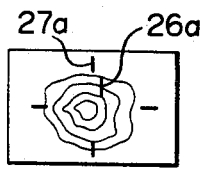
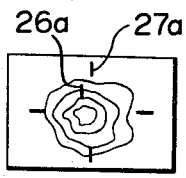
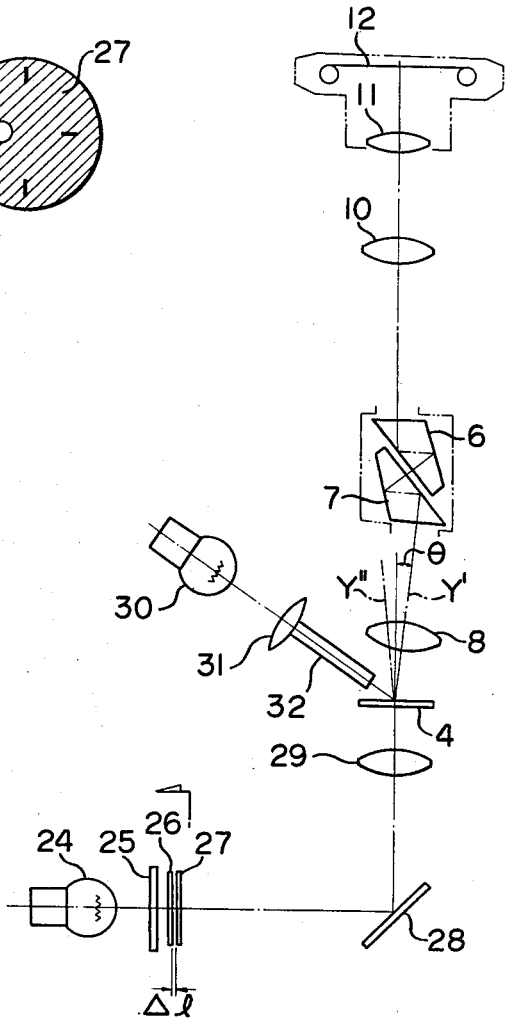
INVENTORS
J. KATO, H. HASEGAWA and M. MIYADERA
BY
ATTORNEY United States Patent Office 3,417,685
Patented Dec. 24, 1968

3,417,685
STEREOSCOPIC PHOTOGRAPHING DEVICE AND PHOTOGRAPHING DIRECTION INDICATOR FOR SUCH DEVICE
Jinichi Kato, Hiroshi Hasegawa and Mitsutaka Miyadera, Tokyo, Japan, assignors to Nippon Kogaku K.K., Tokyo, Japan, a corporation of Japan
Filed Oct. 20, 1965, Ser. No. 498,781
Claims priority, application Japan, Oct. 26, 1964, 39/83,328; Dec. 14, 1964, 39/70,036
7 Claims. (Cl. 95—12)

ABSTRACT OF THE DISCLOSURE

A stereoscopic photographic device in which a rotatable single objective and a prismatic reflector are provided between a camera caseing and a movable stage for a specimen. The reflector inclines the objective optical axis relative to the principal optical axis, the front conjugate point of the objective being the cross point of the objective and principal optical axis and in which the objective optical axis is rotatable about the principal optical axis. A reducing optical system is also provided for projecting reference indicia provided on two spaced plates to be photographed to provide an indication of the direction from which a specimen was photographed.

---

Figure 1:
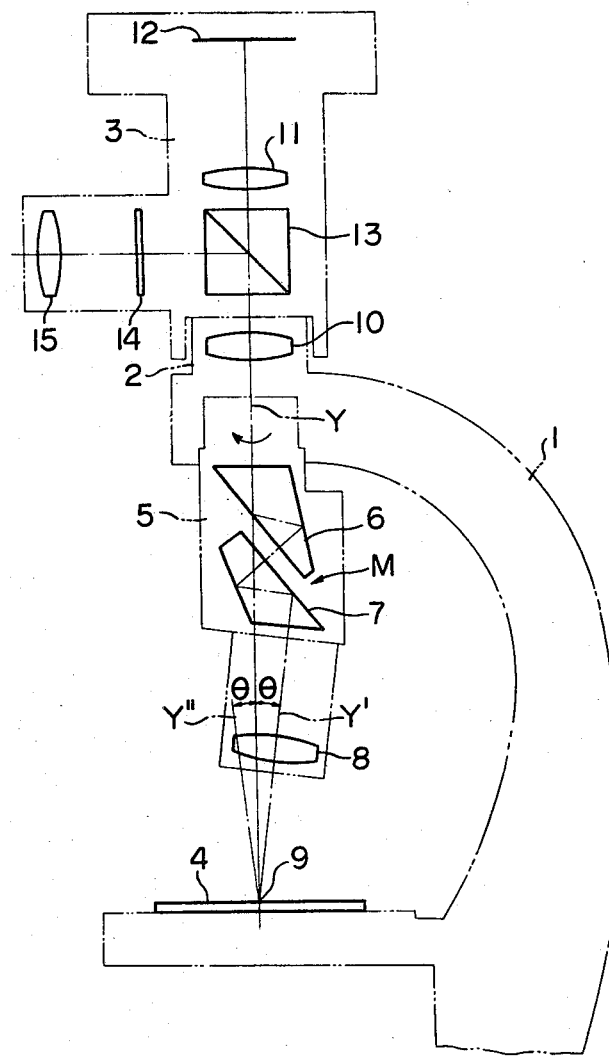

This invention relates to a stereoscopic photographing device offering easier and more convenient use of a stereographic microscope, as well as an exposure direction indicator conveniently usable for stereoscopic photographing devices.

In the past, a microscopic stereographic procedure usually used a binocular type stereographic microscope which is expensive and requires two photographic equipments, or in another procedure, used a monocular type microscope, the photograph is taken by tilting the specimen on the stage to a given angle in two directions, which is done with some difficulty in the angle setting and operation of the remaining equipment.

According to a first aspect of this invention, it provides a stereoscopic photographing device in which an optical path changer such as a prism is interposed behind the objective in the principal optical system, the optical axis of the objective being inclined a given angle to the principal optical axis, the front conjugate point of the objective being coincident with the cross point of the principal optical axis and the optical axis of the objective, the optical axis of the objective being rotatable around the principal optical axis.

As aforementioned and is usual in taking a stereoscopic photograph of a specimen, it is photographed from its right and left directions (180°) with a predetermined stereoscopic angle. The two photographs thus taken are then observed as one set with a stereoscopic mirror. Since, unlike an air photograph, most photographs of microscopic specimens have uniform patterns whose directions cannot be discriminated easily, it becomes very difficult to judge which one of the photographs was photographed from the right (or left) direction. This fact sometimes led to an error. It is of course possible to prevent such a failure if the data for each of the pair of photographs are separaetly photographed, but such procedure requires very troublesome handling.

And consequently, it is a second aspect of this invention to provide a photographing direction indicator for stereoscopic photographing with a microscope, in which a free mark and a reference mark are provided in such a relation that a gap is provided between both marks in the axial direction, both marks being projected at the vicinity of the surface of the specimen with the aid of a reducing optical system.

Figure 2:
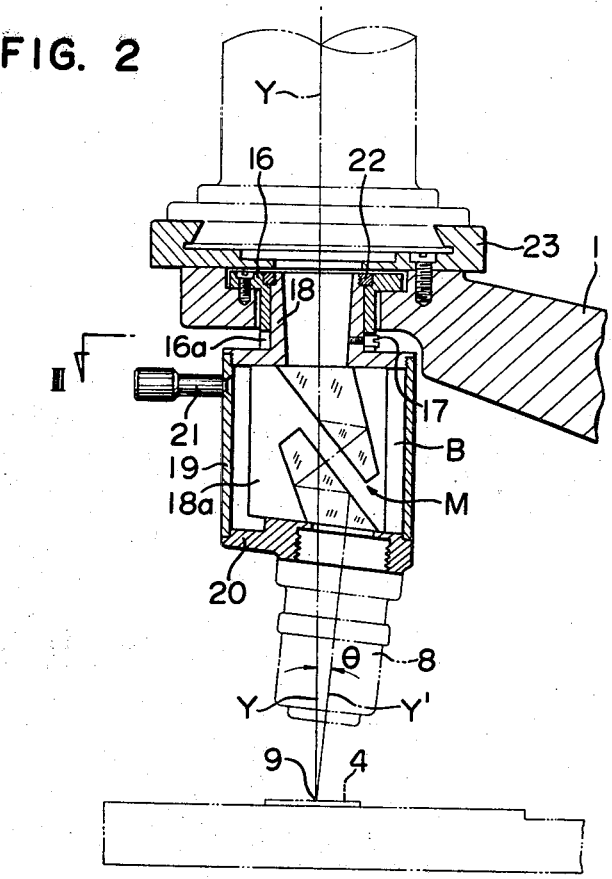
Figure 3:
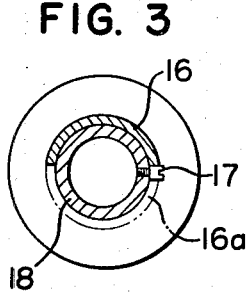

These and other object of this invention will be more clearly understood in connection with the specification which is to follow in connection with the illustrative embodiments shown in the drawing in which:

FIG. 1 shows an illustrative embodiment according to the first aspect of this invention;
FIG. 2 shows the principal structure of the prism box shown in FIG. 1;
FIG. 3 is a sectional top view along the III line of FIG. 2;
FIG. 4 shows an optical array of an illustrative embodiment according to the second aspect of this invention;
FIG. 5, A and B are enlarged respective embodiments of a free mark plate and a reference mark plate and C shows when both plates are overlapped; and
FIG. 6, A and B are views of the field, one from right and the other from left, with the same specimen placed therein.

Now, the description is firstly made with respect to the first aspect of this invention following after the illustrative embodiment shown in FIGS. 1 to 3.

In FIG. 1, 1 is a microscopic arm, 2 is a mirror tube supported by the microscopic arm 1, 3 is a photographic device, 4 is a specimen to be photographed, Y is a principal optical axis so formed as to be perpendicular to the face of the specimen 4 and as to be placed in line with the center of the mirror tube 2, 5 is a prism box installed in a manner that it is allowed to circle or rotate around the optical axis Y, M composed of two prisms 6 and 7 is an optical path shifting prism which inclines the objective optical axis Y′ to a given angle $\theta$ to the principal optical axis Y, and which is fixed inside the said prism box 5. Element 8 is an objective installed on the said objective optical axis Y′ with the front conjugate point thereof constituted so as to meet the cross point 9 of the two optical axes Y and Y′, 10 and 11 are ocular lens and photographic lens, respectively, mounted on the principal optical axis Y, 12 is a film surface, 13 is a semi-permeable prism, 14 is a focal plate and 15 is a finder-ocular lens.

In FIGS. 2 and 3, 16 is a bearing member secured to the said arm 1, with a groove 16a formed at the lower end thereof in which a rotation restricting screw 17 to be described later is allowed to turn 180 degrees around the principal optical axis Y, 18 is a prism holder so supported as to pivot by the aid of the said bearing 16, with the optical path shifting prism M mounted on a fork-shaped section 18a thereunder with a binding agent, push screw, etc., 19 is an outer tube screwed to the said holder 18, 20 is a bottom cover fitted to the lower end of the tube 19, which forms a screw mount on which a regular microscopic objective lens 8 can be installed replaceable, 21 is manipulating knob, 71 is a rotation restricting screw assembly securely screwed to the holder 18, 22 is a locking ring, and 23 is a conventional bayonet on which the said mirror tube will be mounted.

In this structure, with the speciment 4 brought in line with the cross point 9 of the principal optical axis Y and the objective optical axis Y′ by moving up or down the stage, the beam that will observe the specimen 4 from the position inclined to a given angle $\theta$ to the principal optical axis Y enters the photographic equipment 3. Also, turning the prism box 5 180 degrees with the manipulating knob 21 will incline the objective optical axis Y′ leftwards to a given angle $\theta$ to meet the position of Y″ in FIG. 1.

Therefore, if the specimen is photographed in the respective positions, it will give the same result as when the specimen 4 is photographed from two directions with the contained angle $2\theta$, making the stereoscopic photographing possible.

The angle of inclination θ should preferably be brought to a position in the neighborhood of 6 degrees, but the invention, needless to say, allows any other degrees of angle that it. Also, the invention makes it possible to design the prism box to be removable for an alternate use as an attachment for a stereoscopic photography.

As has been described in detail, the use of the stereographic device of the invention permits a stereoscopic photography with a simply constructed, easy to handle, and inexpensive photographic device, thus offering much better efficiency than the conventional photographic procedures from the manufacturing, economical and operational point of view.

In addition, the structure of the invention provides extensive application with not only the microscope but also in optical apparatus such as projector, close photographing device, etc.

Next, the explanation is made with respect to the second aspect of this invention referring to the embodiment shown in FIGS. 4 to 6. In those figures, the same references indicate the equivalent members shown in FIGS. 1 to 3.

In FIGS. 4 to 6, a stereoscopic photographing device shown in FIG. 1 to 3 is employed as an example. In those FIGURES 4 to 6, 24 is the illuminating source, 25 is a mat glass for scattered rays and 26 is a first marker plate made of thin light shielding material. On the first marker disc 26 are formed, as shown in FIG. 5A, one transparent free mark 26a and four transparent holes 26b. Element 27 is a second marker disc made of the same material as the first marker disc. On this disc 27 are also one transparent hole 27b and four transparent reference marks 27a, as illustrated in FIG. 5B. When the two marker discs 26 and 27 are lapped over each other, the free mark 26a is brought in alignment on the second transparent hole 27b while the reference mark 27a being lapped over the first transparent hole 26b, as in FIG. 5C. The gap Δl between discs 26 and 27 is to be set within the product of the square of a reverse number of the magnification of the reducing projector lens 29 and its physical focal depth. Namely, $$\Delta l = \left| \left( \frac{1}{M} \right)^2 \times \frac{n\lambda}{2A_0^2} \right| (\mu)$$

where

M = magnification of reducing projector lens
n = refractive index of optical path medium
λ = wavelength of the ray used
$A_0$ = numerical aperture of reducing projector lens For example, if $M = \frac{1}{10}$ (equivalent to the reverse number of magnification of an ordinary microscope objective), $\lambda = +0.55\mu$, $A_0 = 0.25$, and $n = 1$ then the physical focal depth is $4.4\mu$, and Δl may be set at 0.4 mm.

Element 28 is a reflector, and 29 shows the reducing projector lens as aforementioned. The reducing magnification of the latter 29 is set to be in inverse proportion to the magnification of the objective 8. Lens 29 is arranged so that the image of the reference mark 27a may be formed on the surface of the specimen 4. Therefore, the image of the free mark 26a is formed toward the light source from the specimen surface, and 8 is the objective in the microscopic optical system. The optical axis Y' of this objective inclines at a fixed angle θ to the main optical axis Y. Moreover, the axis Y' is arranged so as to cross the extended line of the main axis Y on the specimen 4.

Elements 6 and 7 are optical path changing prisms, as previously explained, to make the objective path Y' inclined, both prisms being unitary rotatable at 180° with the main optical axis Y as its axis. Element 10, 11, 12, 30, 31 and 32 are, respectively, the eyepiece in the microscopic optical system, photographing lens, film, illuminating ray for illuminating the specimen, condenser lens, and crystal rod for illuminating a local part. The crystal rod 32 is arranged in front of condenser lens 31.

Thus, by lighting 24 and 30, the free mark 26a and reference mark 27a are projected on the specimen 4 in the form of a reduced bright frame, while the specimen is illuminated by the crystal rod 32.

Through the eyepiece 10, patterns of the specimen 4 together with the free mark 26a and reference mark 27a are observed simultaneously in the field of vision. The reference mark 27a is formed right on the specimen 4, but the free mark 26a is formed slightly toward the light source. As a result, where the objective optical axis Y' inclines toward the right, the free mark 26a is seen off the right side of the reference mark 27a, as in FIG. 6A. Where the optical path changing prisms 6 and 7 are rotated at 180° to incline the objective optical axis Y' toward the left (i.e., in the position Y''), the free mark 26a is seen off the left side of the reference mark 27a, as in FIG. 6B.

Consequently, the photographing direction can be discriminated dependent on the position of the free mark 26a in the field of vision (or photographed field). Since the reference mark 27a and free mark 26a have interrelations, their relation may be reversed. Also, since this invention features the gap in the axial direction between images of the reference mark and free mark, either one of the two need not have a coincidence with the surface of the specimen. Moreover, it is unnecessary to provide the reference mark 27a and free mark 26a on separate discs but it may be allowed to provide them on one disc on its right and back sides.

This invention can be used for not only projection type ilumination but also transparent illumination. In the latter case, the relation of the transparency between the free mark and reference mark is reversed.

What is claimed is:

1. A stereoscopic photographic device comprising a movable stage on which a specimen to be observed is placed, an objective, an eyepiece and a photographing optical system, in which an optical path changer is interposed behind the objective in the principal optical system, the optical axis of the objective is inclined a given angle to the principal optical axis, the front conjugate point of the objective being coincident with the cross point of the principal and the objective optical axes, the objective optical axis being rotatable around the principal optical axis.

2. A stereoscopic photographic device according to claim 1, in which said optical path changer comprises two prisms.

3. A stereoscopic photographic device according to claim 1, in which said optical path changer is housed in a prism box which is rotatable by 180 degrees around the principal optical axis.

4. A stereoscopic photographic device according to claim 3, wherein a reducing optical system is provided including a light source, two spaced marker plates each bearing transparent indicia thereon for illumination by the light source, a reflector on and inclined to the principal optical axis to deflect the indicia images into the principal optical system, and a reduction lens interposed between the reflector and the specimen stage for forming overlapping indicia images in the vicinity of the specimen, the spacing between the plates being within the product of the square of magnification and focal depth of the reduction lens.

5. A stereoscopic photographic device according to claim 4, wherein the transparent indicia of the marker plates comprise a plurality of openings and a reference mark on one plate and an aqual plurality of reference marks and an opening on the other plate, the openings and reference marks being so disposed that the reference marks and the openings on both plates are in alignment.

6. A stereoscopic photographic device according to claim 3, wherein a prism is interposed on the principal optical axis behind the optical path changer to provide a divergent optical path, and an ocular optical system for the divergent path comprising a focal plate on which the image of the specimen is focussed and an ocular finder lens.

7. A stereoscopic photographic device according to claim 4, wherein a prism is interposed on the principal optical axis behind the optical path changer to provide a divergent optical path, and an ocular optical system for the divergent path comprising a focal plate on which the images of the specimen and indica are focussed, and an ocular finder lens.

References Cited
UNITED STATES PATENTS

| | | | |
|---|---|---|---|
| 2,080,604 | 5/1937 | Draper | 352—62 X |
| 2,508,487 | 5/1950 | Bonnet | 352—62 X |
| 3,191,490 | 6/1965 | Rabinow | 88—24 |

NORTON ANSHER, *Primary Examiner.*

R. A. WINTERCORN, *Assistant Examiner.*

U.S. Cl. X.R.

350—19, 49; 352—57, 62